(12) United States Patent
Wiryaman et al.

(10) Patent No.: US 8,069,244 B2
(45) Date of Patent: Nov. 29, 2011

(54) METHOD FOR DEFINING A SET OF RULES FOR A PACKET FORWARDING DEVICE

(75) Inventors: Santa Wiryaman, Lexington, MA (US); Manickam R. Sridhar, Holliston, MA (US)

(73) Assignee: Barracuda Networks Inc, Campbell, CA (US)

( * ) Notice: Subject to any disclaimer, the term of this patent is extended or adjusted under 35 U.S.C. 154(b) by 98 days.

(21) Appl. No.: 12/551,147

(22) Filed: Aug. 31, 2009

(65) Prior Publication Data

US 2010/0088741 A1    Apr. 8, 2010

Related U.S. Application Data

(62) Division of application No. 11/367,765, filed on Mar. 3, 2006.

(51) Int. Cl.
*G06F 15/173*    (2006.01)
*H04L 29/06*    (2006.01)

(52) U.S. Cl. ............. 709/225; 709/223; 726/1; 715/700

(58) Field of Classification Search .................. 709/223, 709/225; 726/1; 715/700
See application file for complete search history.

(56) References Cited

U.S. PATENT DOCUMENTS

| | | | | |
|---|---|---|---|---|
| 6,078,953 A * | 6/2000 | Vaid et al. | | 709/223 |
| 7,107,613 B1 * | 9/2006 | Chen et al. | | 726/14 |
| 7,296,288 B1 * | 11/2007 | Hill et al. | | 726/2 |
| 7,318,237 B2 * | 1/2008 | Moriconi et al. | | 726/27 |
| 7,324,447 B1 * | 1/2008 | Morford | | 370/231 |
| 7,324,553 B1 * | 1/2008 | Varier et al. | | 370/468 |
| 7,366,101 B1 * | 4/2008 | Varier et al. | | 370/241 |
| 7,496,661 B1 * | 2/2009 | Morford et al. | | 709/224 |
| 7,543,052 B1 * | 6/2009 | Cesa Klein | | 709/224 |
| 7,546,629 B2 * | 6/2009 | Albert et al. | | 726/1 |
| 7,599,283 B1 * | 10/2009 | Varier et al. | | 370/216 |
| 7,631,351 B2 * | 12/2009 | Erofeev | | 726/11 |
| 7,660,803 B2 * | 2/2010 | Jin | | 715/741 |
| 7,739,722 B2 * | 6/2010 | Okajo et al. | | 726/2 |
| 7,742,406 B1 * | 6/2010 | Muppala | | 370/230 |
| 7,747,736 B2 * | 6/2010 | Childress et al. | | 709/224 |
| 7,778,194 B1 * | 8/2010 | Yung | | 370/252 |
| 2002/0093527 A1 * | 7/2002 | Sherlock et al. | | 345/736 |
| 2003/0110192 A1 * | 6/2003 | Valente et al. | | 707/513 |
| 2003/0154399 A1 * | 8/2003 | Zuk et al. | | 713/201 |
| 2003/0208597 A1 * | 11/2003 | Belgaied | | 709/225 |
| 2004/0190526 A1 * | 9/2004 | Kumar et al. | | 370/395.21 |
| 2006/0072451 A1 * | 4/2006 | Ross | | 370/229 |
| 2006/0149845 A1 * | 7/2006 | Malin et al. | | 709/228 |
| 2009/0037594 A1 * | 2/2009 | Sever et al. | | 709/230 |
| 2009/0172821 A1 * | 7/2009 | Daira et al. | | 726/27 |

\* cited by examiner

*Primary Examiner* — Alina N. Boutah
(74) *Attorney, Agent, or Firm* — Patentry

(57) ABSTRACT

There are methods and apparatus, including computer program products, for defining a policy including a set of rules for a packet forwarding device by receiving information sufficient to enable a first rule related to one of security or traffic management to be defined, and based on the received information, enabling a corresponding second rule related to the other one of security or traffic management to be defined.

3 Claims, 10 Drawing Sheets

600

Add Advanced Filter

Matching 602
Source IP Address [Any ▼]
Destination IP Address [Any ▼]
☐ IP Fragments

Operation 604
⦿ Drop
◯ Reject

Drop packets, and send TCP Reset or ICMP Host Unreachable packets to sender.

◯ Accept

Access all packets related to this session.
This session is handled by Stateful Packet Inspection (SPI).

◯ Accept Packet

Access packets matching this rule only.
Do not use Stateful Packet Inspection (SPI) to also automatically accept packets related to this session.

Assign filter to class: 608

Logging [None ▼]
  None
  Default
  Voice

☐ Log packets matched by this rule.

FIG.6a

Scheduler

| Schedule: | Always | New |

| Service Name | ALG | Protocols and Ports | Action |
|---|---|---|---|

User-Defined Services

New User-Defined Services

Basic Web Utilities

☐ All Traffic           Protocol Any

TCP 53 -> 53
                            1024-65535 -> 53

☐ DNS - Domain Name Server    UDP 53 -> 53
                              1024-65535 -> 53

☐ FTP - File Transfer    ALG_FTP    TCP Any -> 21

☐ HTTP - Web Server                 TCP Any -> 80

☐ HTTP Secondary - Secondary Web Server    TCP Any -> 8080

• • •

Virtual Private Networking

☐ PPTP - Point-to-point Tunneling Protocol    TCP Any -> 1723
                                              GRE GRE
                                              UPD 500 -> 500
☐ IPSec - Internet Protocol Security          EPS
                                              AM

Instant Messaging Applications

☐ AIM V3.0    ALG_AIM    TCP Any -> 5190

☐ MSN Messenger    ALG_MSN    TCP Any -> 1863

⋮    ⋮

File Sharing Utilities

☐ Gnutella Server    TCP Any -> 6346

☐ KaZaA    TCP Any -> 1214

⋮    ⋮

Chat and VoIP Applications

☐ SIP    ALG_SIP_UDP    UDP Any -> 5060

TCP Any -> 7648-7649
Any -> 1720

☐ CU-SeeMe    UDP Any -> 7648-7649
Any -> 24033
Any -> 56800

Gaming Consoles

☐ XBox  TCP Any -> 3074

☐ Play-Station2  TCP Any -> 10070-10080
UDP Any -> 10070

⋮  ⋮

Games

☐ Alien vs. Predator  TCP Any -> 2300-4000
UDP Any -> 88
Any -> 3074

☐ CivNet  TCP Any -> 1942

☐ DirestX Games - Battlezone, Battlefield Communicator, Age of Wonders, Allegiance, Alpha Centauri, MechWarrior3, Midtown Madness, Motocross Madness  TCP Any -> 47624-47625
Any -> 2300-2400
Any -> 26800-28912
UDP Any -> 47624-47625
Any -> 2300-2400

Network Administration Utilities

☐ AUTH - Authentication Server            TCP Any -> 113

☐ Lotus Domino                             TCP Any -> 1352
                                           UDP Any -> 10070

☐ SQL-Net Tools Server                     TCP Any -> 1521

⋮                                          ⋮

Remote Desktop Utilities

☐ Citrix Winframe Server                   TCP Any -> 1494

☐ FCAnywhere                               TCP Any -> 5631-5632
                                           UDP Any -> 5631-5632

☐ Remote Desktop 32                        TCP Any -> 5044-5050

⋮                                          ⋮

✓ OK    X Cancel

METHOD FOR DEFINING A SET OF RULES FOR A PACKET FORWARDING DEVICE

This is a divisional application of US non-provisional utility application Ser. No. 11/367,765, NETWORK INTERFACE DEVICE, filed 3 Mar. 2006 by Santa Wiryaman. A co-pending application with apparatus claims has been filed as Ser. No. 12/551,169 on Aug. 31, 2009.

BACKGROUND

This description relates to a network interface device integrating security and traffic management functions.

The present invention is directed to the method for creating security rules and traffic management rules for operating the network interface device.

No new matter is introduced in this divisional application.

Two critical concerns of Internet Protocol (IP) networks are security and traffic management. To secure an IP network, for example, a local area network, a device such as a firewall can be deployed at the boundary between the local area network and a wide area network (e.g., the Internet) to prevent unauthorized access from sources external to the network. Firewalls serve as a point of network access where incoming traffic from remote sources and outgoing traffic to the Internet can be analyzed and controlled.

Due to the development of new services, IP networks today carry multiple types of traffic, such as voice, video, email, and web traffic to name a few. The convergence of multiple types of traffic requires adequate traffic management to ensure that the quality of service (QoS) requirements of each of these services can be met. Maintaining the requisite level of quality of service generates specific constraints as services have different characteristics. For example, voice services are sensitive to both delay and delay variations as distortions of the voice may drastically impact the quality and/or interactivity of the communication, but are generally tolerant to some loss. Video services, on the other hand, are insensitive to delay as compared to voice services, but may be more sensitive to delay variations and loss. Data services in general are largely immune to delay and delay variations, but are sensitive to loss. Uncontrolled traffic in data services have the tendency to consume the entire available pipe simply by the nature of the transport protocol used to transfer the data.

Security and traffic management functions are typically implemented by two separate network devices or two separate logical components of a single physical package that are coupled in series and configured independently of each other by different personnel. Miscommunication between the personnel can lead to conflict during operation of the security and traffic management functions. Further, as the two functions behave independently of each other, packet classification is performed twice (once by each function), which adds to processor load and increases latency.

SUMMARY

In one aspect, implementations of the invention feature a method for defining a policy including a set of rules for a packet forwarding device. The method includes receiving information sufficient to enable a first rule related to one of security or traffic management to be defined, and based on the received information, enabling a corresponding second rule related to the other one of security or traffic management to be defined.

In another aspect, implementations of the invention feature an apparatus that includes management logic and coordination logic. The management logic is configured to receive information sufficient to enable a first rule related to one of security or traffic management to be defined, enable a corresponding second rule related to the other one of security or traffic management to be defined based on the received information, and store attributes of the first rule and attributes of the second rule in a configuration database. The coordination logic is configured to send a first signal to a first engine of a packet forwarding device to notify the first engine of the newly-stored attributes of the first rule, and send a second signal to a second engine of the packet forwarding device to notify the second engine of the newly-stored attributes of the second rule.

In another aspect, implementations of the invention feature a network device that includes a first network interface and a second network interface, each of the network interfaces being capable of bi-directional communication; a policy including a set of rules for the device, the set of rules including security rules and traffic management rules; a security engine to filter packets received at the first network interface of the device, the security engine comprising logic to classify each of the packets received at the first network interface, and logic to process the classified packets in accordance with one or more of the security rules to identify accepted packets; and a quality of service engine to schedule the accepted packets for transmission through the second network interface of the device, the quality of service engine comprising logic to queue the accepted packets for transmission based on the classifying performed by the security engine, and logic to process each of the accepted packets queued for transmission in accordance with one or more of the traffic management rules.

Implementations of the invention may include one or more of the following advantages.

By enabling the security and traffic management functions to be configured in relation to each other, conflict between the functions is reduced significantly (eliminated) during operation. As the functions logically behave as a tightly integrated unit, packet classification need only be performed once, which minimizes latency and reduces the load on the processor. Deployment of a single physical package is cost effective in terms of installation and maintenance. Another advantage of this invention is that the dynamically negotiated ports can be identified by the classification engine and dynamically used to open pinholes in the firewall while simultaneously identifying the parent and child flows to be processed by the traffic management engine.

The details of one or more examples are set forth in the accompanying drawings and the description below. Further features, aspects, and advantages of the invention will become apparent from the description, the drawings, and the claims.

DESCRIPTION OF DRAWINGS

FIGS. 5, 6a-6e, and 7 each show a screen shot of a graphical user interface for use in configuring an interface device.

DETAILED DESCRIPTION

Figure 1:
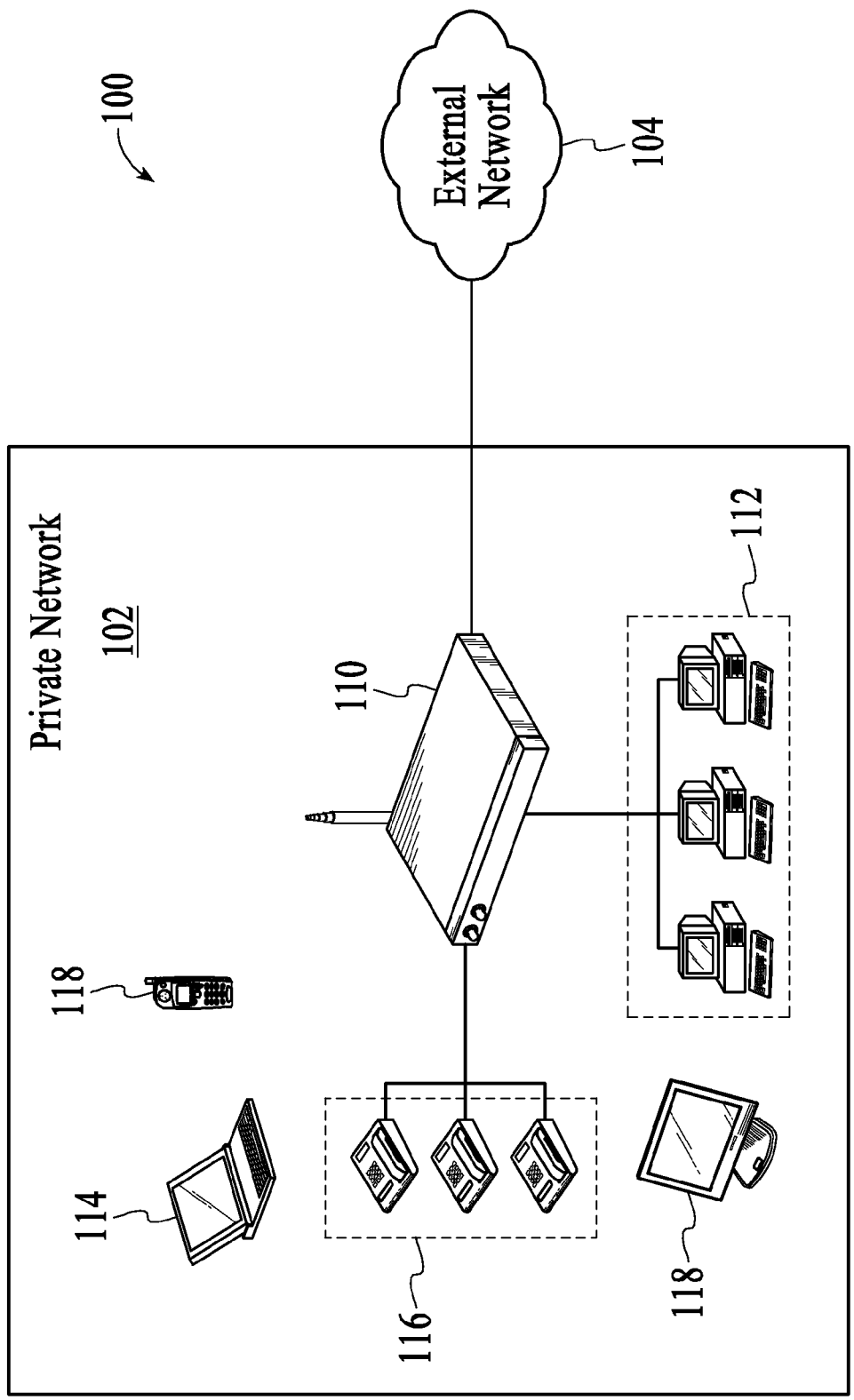
FIG. 1 shows a communication system.

FIG. 1 shows a communication system 100 in which an interface device 110 supporting voice, video, and data services is deployed at an intersection of a private network 102 and a public network 104. The private network 102 can include one or more networks, such as a local area network (LAN) and a wireless local area network (WLAN). Each of the LAN and the WLAN includes nodes that are connected using wired, wireless, or optical connections. In the illustrated example, the nodes are personal computers 112, laptops 114, Voice over IP (VoIP)-enabled devices 116, and other devices 118 that are capable of transmitting/receiving voice, video, and/or data communications. The public network 104 can include one or more networks, such as the Internet, an intranet, another LAN, and/or a wide area network (WAN). The interface device 110 manages bi-directional traffic between the private network 102 and the public network 104. The bi-directional traffic can include packets of a variety of protocols, such as the Internet Protocol (IP), the Session Initiation Protocol (SIP), the User Datagram Protocol (UDP), the Transmission Control Protocol (TCP), the File Transfer Protocol (FTP), the Post Office Protocol 3 (POP3), the Simple Mail Transfer Protocol (SMTP), and the Real-time Transport Protocol (RTP), that carry a variety of application traffic.

Figure 2:
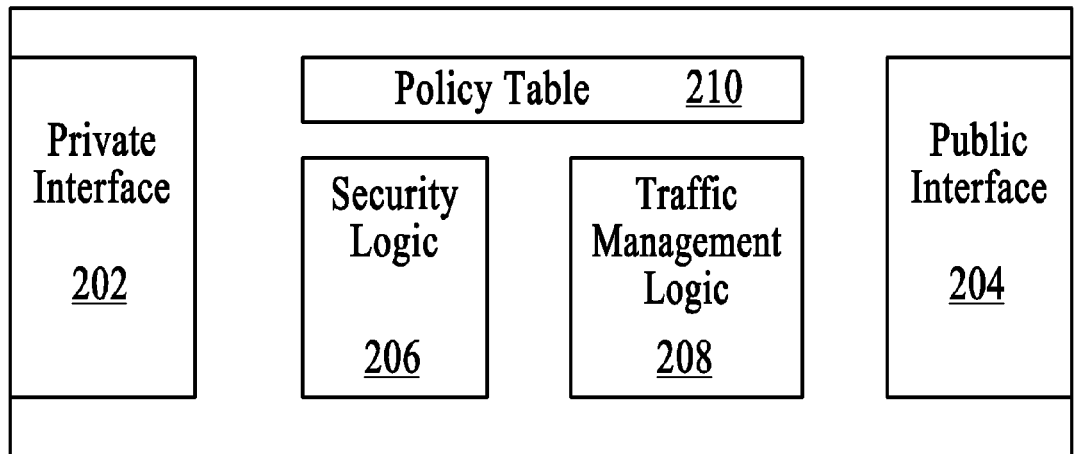
FIGS. 2 and 3 each show a block diagram of an interface device.

Referring to FIG. 2, in one implementation, the interface device 110 includes a first interface (e.g., "private interface" 202) to the private network 102 and a second interface (e.g., "public interface" 204) to the public network 104. Although each of the interfaces 202, 204 is depicted as a discrete component of the interface device 110, each interface 204, 204 can be implemented as a single component that supports bi-directional communication or separate components (e.g., a transmit port and a receive port) each supporting uni-directional communication.

The interface device 110 also includes security logic 206 and traffic management logic 208 for handling packets passing between the private network 102 and the public network 104. Details of each of the security logic 206 and the traffic management logic 208 are described below with reference to FIG. 3. The interface device 110 also includes other logic not depicted in FIG. 2 to aid in the reception, processing, and transmission of packets between the private network and the public network. Such logic can include packet routing logic, SIP-based call processing logic, VPN, Frame relay and ATM stacks, various device drivers etc., to name a few. The logic included in the interface device 110 can be implemented as hardware (e.g., an application specific integrated circuit or a field programmable gate array), software, or a combination of both.

The interface device 110 further includes a policy table 210 that specifies how different classes of data flows are to be processed in accordance with a policy set in the interface device 110. The policy table 210 includes a number of records, each of which is associated with a class of data flows, and contains information ("data flow characterization information") that characterizes the class of data flows using a set of attributes, information ("conditions information") that defines the conditions when one or more security and/or traffic management rules should be applied, and information ("class identifier") that uniquely identifies the class of data flows.

Figure 3:
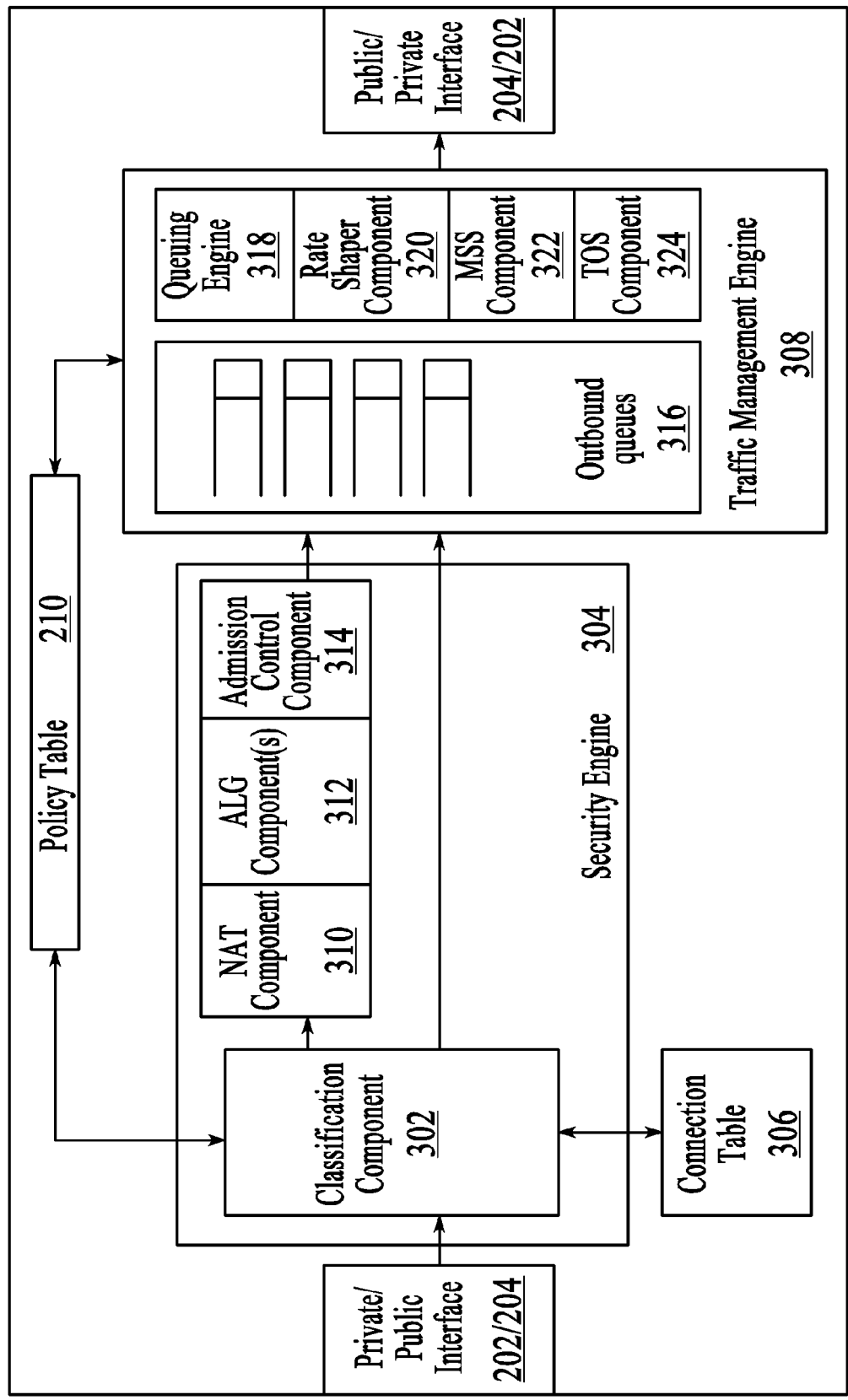

Referring to FIG. 3, packets arriving at the interface device 110 through the private interface 202 or the public interface 204 are first examined by a classification component 302 of an engine ("security engine" 304) implementing the security logic 206 to determine which data flow each incoming packet belongs to. In one example, the classification component 302 applies a hash function to five attributes of an incoming packet, namely source address, source port, protocol, destination address, and destination port to generate a hash key.

The classification component 302 then performs a lookup operation of a connection table 306 to determine whether an entry matching the generated hash key is present in the connection table 306.

If a match is found, this indicates to the classification component 302 that the incoming packet is part of an existing data flow (also referred to as a "connection"). Generally, the matched entry contains an admission control directive (e.g., "accept," "deny," or "drop"), and a class identifier that uniquely identifies the class of data flows with which the existing connection is associated. The classification component 302 applies the admission control directive to the incoming packet, and in those instances in which the accept admission control directive is applied, tags the incoming packet with the class identifier provided in the matched entry, prior to forwarding the tagged packet to an engine ("traffic management engine" 308) implementing the traffic management logic.

If no match is found, this indicates to the classification component 302 that the incoming packet is the first packet of a new connection. The classification component 302 sequentially searches the records of the policy table 210 to locate a record containing data flow characterization information that matches the five attributes of the incoming packet. Once the record is located, the classification component 302 generates a new entry for that specific connection in the connection table 306. The new entry is addressable by the hash key and contains the conditions information and class identifier provided in the located record.

The classification component 302 optionally directs the packet to a network address translation (NAT) component 310 for additional processing. The NAT component 310 translates private IP addresses and port numbers within the private network 102 into public IP addresses and port numbers when the communication passes between the private and public networks. The NAT component 310 enables IP addresses and port numbers in the private network 102 to be concealed from the public network 104 using techniques commonly known in the art. For example, source information in the headers of packets received from the private network 102 and destined for the public network 104 can be changed to reflect the IP address and port number of the interface device 110. The NAT component 310 maintains a binding table that links private IP addresses and port numbers with public IP addresses and port numbers. When a reply returns to the interface device 110, the NAT component 310 uses the bindings in the binding table to determine where on the private network 102 to forward the reply.

The NAT component 310 places constraints on the deployment of services that carry IP addresses (or address derivatives) in the data stream, and operates on the assumption that each session is independent. However, there are services with higher-layer protocols (such as FTP, H.323, SIP, and MGCP) that use control packets to set the characteristics of the follow-on packet streams in their control packet payload. Services like these assume end-to-end integrity of addresses and will generally fail when traversing the NAT component 310. To address this issue, the interface device 110 can be implemented with an application level gateway (ALG) component 312 that exists within or alongside the NAT component 310 (as shown in the illustrated example of FIG. 3) to update any payload data made invalid by the NAT component 310. As an ALG component 312 needs to understand the higher-layer protocol being fixed, each protocol that may embed an IP address within a data stream requires a separate protocol-specific ALG component 312. In addition to updating the payload data, each protocol-specific ALG component 312 also negotiates with the NAT component 310 to reserve any specific port or port ranges necessary to support the protocol for the duration of a session. These reserved port or port ranges, commonly referred to as "pinholes," are dynamically opened and closed during a session to enable the packets of the follow-on packet streams (e.g., media streams of a SIP call) to pass through the interface device 110. These pinholes are permanently closed at the termination of the session to avoid possible attacks or unwanted intrusions on the internal network.

Once the packet has been processed by the NAT component 310 (and if necessary, a protocol-specific ALG component 312), an admission control component 314 of the interface device 110 issues an admission control directive for the packet based on the conditions information specified for the class of data flows with which the packet is associated. In one example, the admission control component is implemented to issue an "accept" directive only if the additional connection (of which the packet is associated) and existing connections of the class consume a total bandwidth that is less than the maximum bandwidth for the class, otherwise the admission control component issues a "drop" directive in which the packet is silently dropped or a "deny" directive in which a message is returned to the node that originated the packet.

The connection table entry corresponding to the connection with which the packet is associated is then augmented to include the issued directive. If an "accept" directive has been issued for a packet, the security engine 304 tags the packet with the class identifier provided in the packet's connection table entry, and forwards the tagged packet to the traffic management engine 306 for placement into one of a number of outbound queues 316 based on its class identifier.

In one implementation, the traffic management engine 306 includes a queuing engine 318, a rate shaper component 320, a maximum segment size (MSS) component 322, and a type of service (TOS) component 324 for managing outbound traffic in accordance with the policy so as to avoid congestion, packet loss, and application performance degradation. Many transport-layer protocols include end-to-end acknowledgments. In TCP, an acknowledgement includes a field that indicates to a sender the amount of data (a "window size") that it may send without acknowledgment. This field is typically used for window-based flow control. As packets of a connection pass from a source node to a destination node, acknowledgement packets are passed through the rate shaper component 320. For TCP-based flows, the rate shaper component 320 modifies the acknowledgement packets to control the rate at which packet is sent for those connections, thereby controlling the depth of the outbound queues for those connections. This mechanism is particularly useful for TCP-based connections. In TCP, when a connection is initially established, the window size may be too large and then converge slowly to a smaller value based on feedback from the destination. Using the rate shaper component 320, the initial window size can be set smaller thereby not having to rely on feedback from the destination to reduce the window size. The maximum segment size component 322 can be used to modify the maximum requested segment size for packets in a connection. This mechanism is used to cause a source of a relatively low priority connection to use smaller packets so that a higher priority connection does not suffer long latency when it gets queued behind a long low-priority packet. The TOS component 324 examines a TOS bit of each packet to determine a precedence for the packet. Preferential service can be provided to higher priority packets. For example, packets that are part of an interactive application may have a TOS bit associated with a higher priority than packets that are part of a bulk file transfer between sites.

Figure 4:
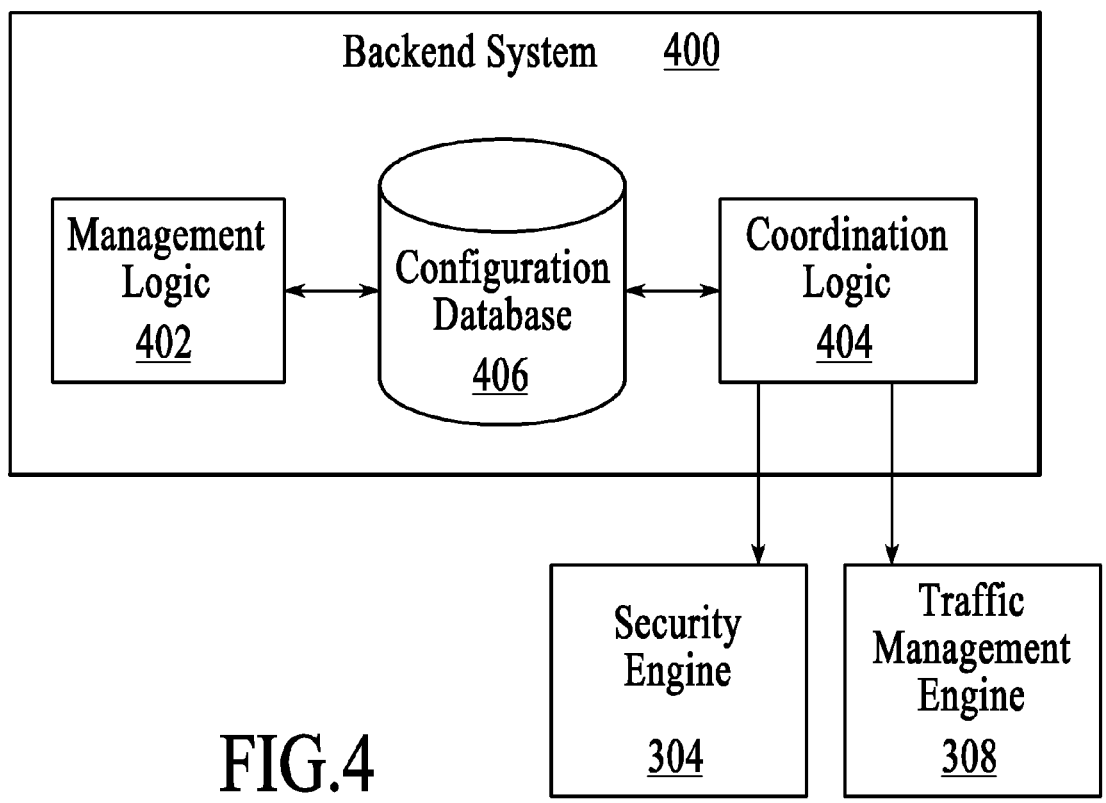
FIG. 4 shows a backend system for use in configuring an interface device.

FIG. 4 shows a backend system 400 for use in configuring the interface device 110. The system 400 includes management logic 402, coordination logic 404, and a configuration database 406. The management logic 402 implements a graphical user interface (GUI) through which a user, such as an administrator of the interface device 110, can specify and/or modify a policy for the interface device 110.

Figure 5:
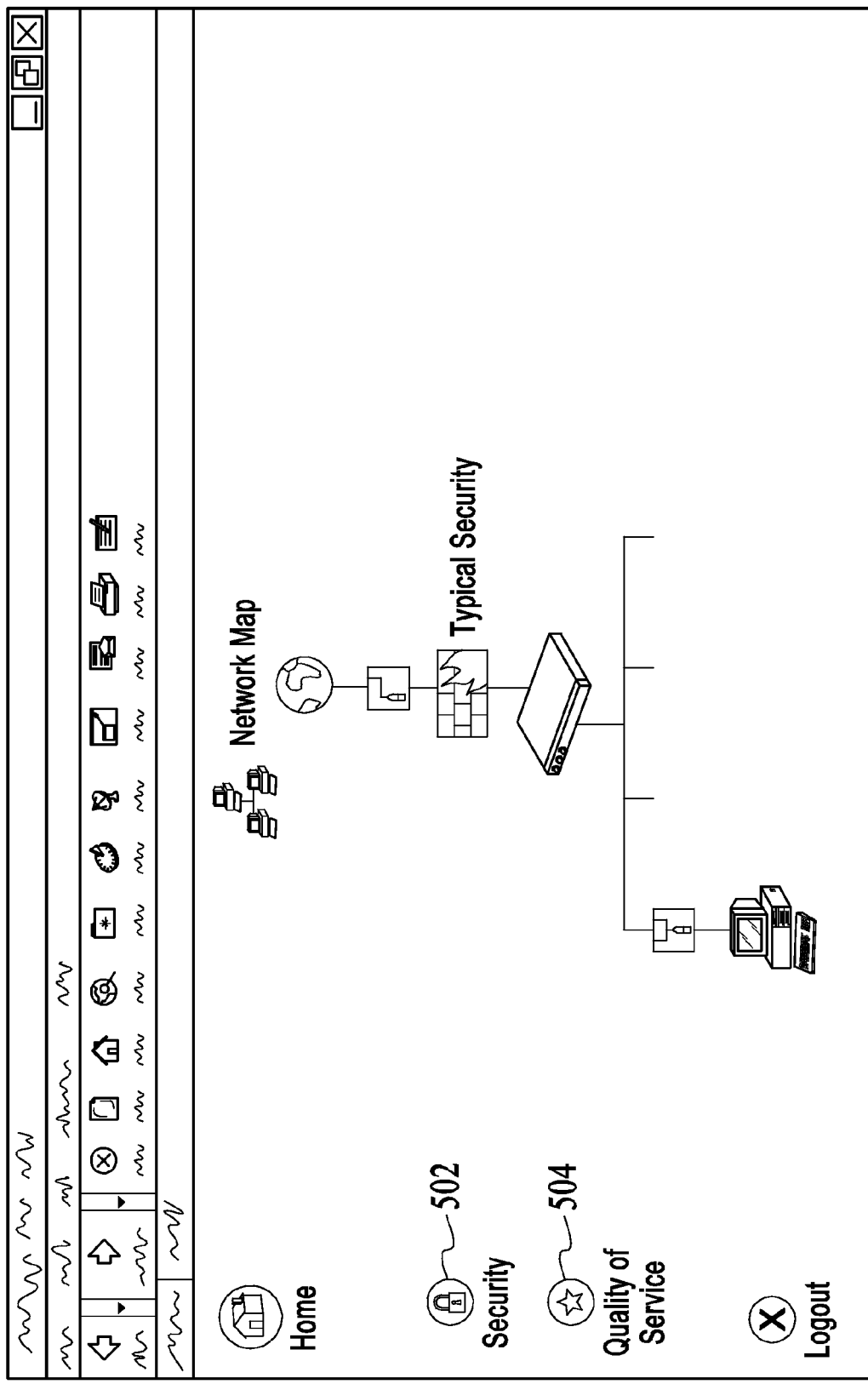

When the user launches the GUI, the user is presented with a network map screen 500, illustrated in FIG. 5. From the network map screen 500, the user can add a new security rule or a new traffic management rule to the policy for the interface device 110 by clicking on the appropriate icon (e.g., security icon 502 or traffic management icon 504) displayed on the sidebar on the left-hand side of the network map screen. Suppose, for example, that the user clicks on the security icon 502. This action brings up a security settings screen 600, illustrated in FIGS. 6a-6e, that allows the user to enter various pieces of information to enable a new security rule to be defined. The information includes attributes of IP address matching parameters 602, operation parameters 604, and service parameters 606.

To apply the security rule, a match has to be made between IP addresses. The user can define a coupling of source and destination traffic by specifying "Source IP address" and "Destination IP address" attributes.

For those packets that match the source and destination IP address attributes of the IP address matching parameters, the user can specify an action to be taken using the operation parameters. In one example, the action is one of "drop" (i.e., deny access to packets that match the source and destination IP address), "reject" (i.e., deny access to packets that match the source and destination IP address and send a response to the node(s) originating the packet(s)), and "accept" (i.e., allow access to packets that match the source and destination IP address).

The user can also select one or more services to which this security rule is to be applied. FIGS. 6a-6e shows a list of services that are generally categorized by type. For example, under the "Basic Web Utilities" service type, the user can select the checkboxes alongside the following: FTP—File Transfer, HTTP—Web Server, IMAP—Messaging Server, NNTP—News Server, SNMP—Simple Network Management Protocol, and TELNET—Remote Connection. Under the "Chat and VoIP Applications" service type, the user can select the checkboxes alongside the following: SIP, Net2Phone, H.323 Call Signaling, and MGCP. Under the "Gaming" service type, the user can select Delta Force, Quake III, and Warbirds 2.

In one implementation, the user can also select a traffic management class to which the security rule is to be linked. Referring to the "Assign filter to class" portion 608 of the security settings screen of FIG. 6a, if no traffic management classes have been defined, only a "Default" traffic management class is provided for selection. This "Default" traffic management class generally corresponds to a standard class of service in which no special processing is performed by the traffic management engine other than limiting the total bandwidth of all packets used by all services in the standard class of service to be within the bandwidth of the connection. If traffic management classes have been defined (as shown in FIG. 6a), the user can link the security rule to a specific class by choosing one of the traffic management classes provided in a drop down menu in the "Assign filter to class" portion of the security settings screen. If none of the existing traffic management classes provided in the drop down menu are satisfactory, the user can define a new traffic management class by clicking on the traffic management icon on the left-hand side of the network map screen. This action brings up a traffic management settings screen 700, illustrated in FIG. 7, that allows the user to enter various pieces of information to customize a traffic management rule. The information includes the total amount of bandwidth that is guaranteed to this class of data flows, whether rate shaping applies to this class of data flows, burst bandwidth, priority, type of service, to name a few. In the case of a voice service, the user can identify a number of calls to be simultaneously permitted per codec for the premium class of service associated with the voice service. Once the user clicks on the "OK" button 702 on the bottom of the traffic management settings screen 700, the coordination logic 404 of the backend system 400 stores the attributes of the newly-defined traffic management rule in the configuration database, and returns the user to the previously-displayed security settings screen. From this screen, the user can select the newly-defined traffic management class from the drop down menu of the "Assign filter to class" portion of the security settings screen.

Once the user clicks on the "OK" button 610 at the bottom of the security settings screen 600, the coordination logic 404 of the backend system 400 stores the attributes of the security rule in the configuration database 406 and automatically creates and stores the linking information between the security rule and the traffic management class.

In another implementation, the management logic 402 has access to information that categorizes services by class. For example, services such as SIP, Net2Phone, and H.323 are recognized as being voice services that are sensitive to both delay and delay variations, and data flows associated with SIP, Net2Phone, and H.323 are placed into a premium class of data flows. Services such as Citrix, PPTP, and TELNET are recognized as being time-sensitive data services, and data flows associated with Citrix, PPTP, and TELNET are placed into a critical class of data flows. Services such as HTTP, FTP, and SNMP are recognized as being non-time-critical data services, and data flows associated with HTTP, FTP, and SNMP are placed into a standard class of data flows. Each of these classes of data flows (i.e., premium, critical, and standard) has a default traffic management rule.

When the user clicks on the "OK" button 610 on the bottom of the security settings screen 600, the management logic 402 identifies the classes of data flows associated with the services selected by the user in the security settings screen, and generates class-based traffic management rules based on the respective defaults. For example, if the user selects SIP and Citrix as being the services to which the security rule is applied, the management logic automatically generates two traffic management rules: (1) a traffic management rule for the premium class of data flows based on the user selection of SIP; and (2) a traffic management rule for the critical class of data flows based on the user selection of Citrix. The coordination logic of the backend system stores the attributes of the security rule in the configuration database and automatically creates and stores the linking information between the security rule and the traffic management class(es).

Although the description above is directed to the generation of one or more traffic management rules based on information provided by the user with respect to a security rule, the techniques are also applicable to the scenario in which the user enters sufficient information to define a new traffic management rule, and one or more security rules corresponding to the new traffic management rule are generated by selecting either a new inbound filter 706 or a new outbound filter 708.

Figure 7:
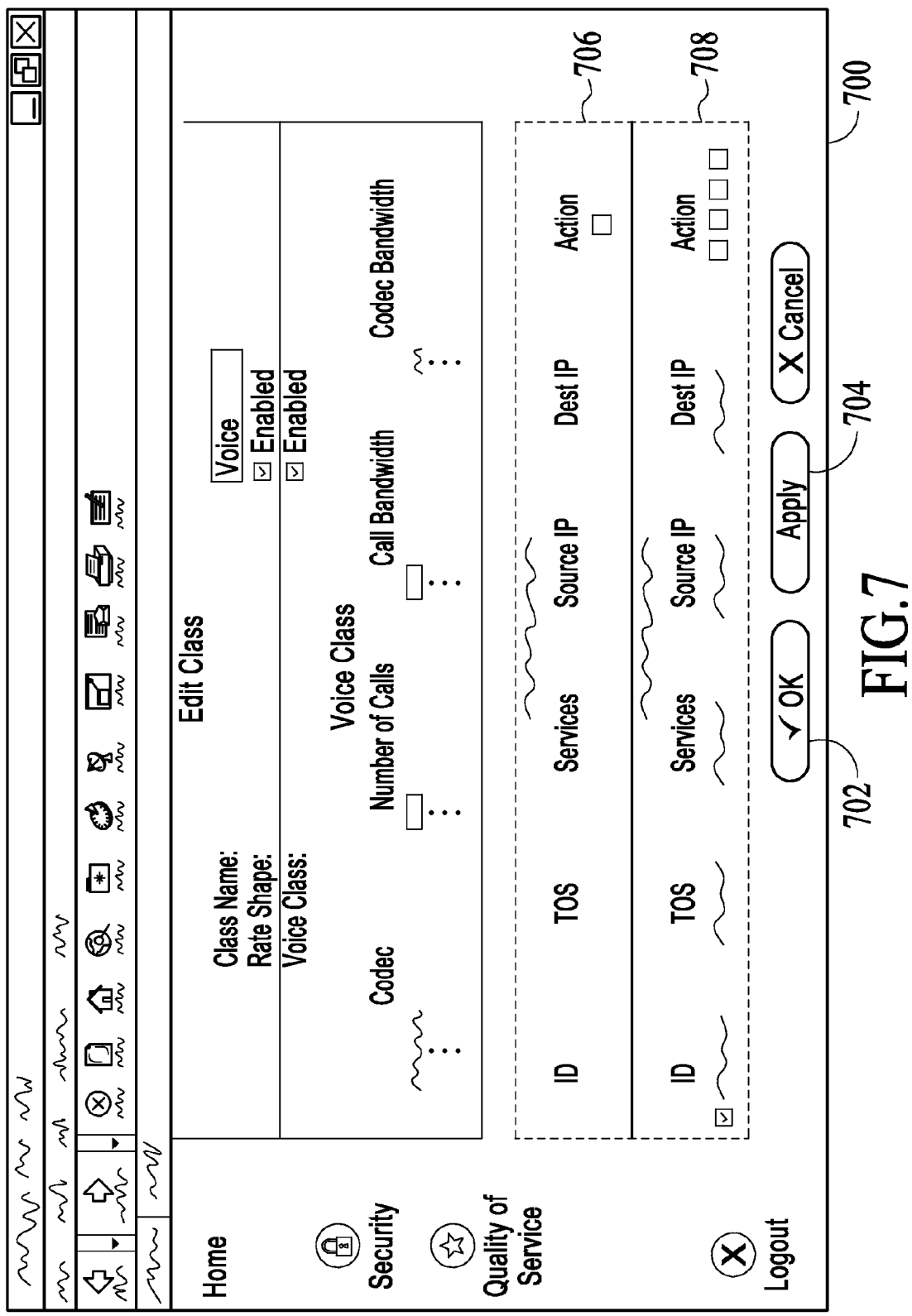

Once the user is satisfied with the number of security and traffic management rules that have been added to the policy of the interface device 110, the user can select an "Apply" button 702, illustratively depicted at the bottom of the traffic management settings screen 700 in FIG. 7. This action causes the coordination logic 404 to send respective notification signals to the security engine 304 and the traffic management engine 306 indicating that the configuration database has been updated. The security engine 304 responds to the notification signal by retrieving the attributes associated with the security rules from the configuration database 406, loads the retrieved attributes, and restarts itself. Likewise, the traffic management engine 306 responds to the notification signal by retrieving the attributes associated with the traffic management rules from the configuration database, and loads the retrieved attributes, and restarts itself. Once the security engine 304 and the traffic management engine 308 have been restarted, the interface device 110 is ready to accept and process packets in accordance with the updated policy.

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the techniques described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element, for example, by clicking a button on such a pointing device). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The techniques described herein can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact over a communication network. The relationship of client and server arises by virtue of computer programs running on the respective computers and having a client-server relationship to each other.

Other embodiments are within the scope of the following claims. The following are examples for illustration only and not to limit the alternatives in any way. The techniques described herein can be performed in a different order and still achieve desirable results.

What is claimed is:

1. A method for defining a policy including a set of rules for a packet forwarding device which integrates security and traffic management, the method implemented on a computer system, comprising:
    presenting a graphical user interface (GUI) through which a user can specify and/or modify a new traffic management class of data flows, whether rate shaping applies to this class of data flows, burst bandwidth, priority, and type of service; and a traffic management service class selection screen on which the user can select traffic management services, the selection screen comprising a "Basic Web Utilities" service type, a "Voice Applications" service type, and a "Gaming" service type; and
    presenting a GUI through which a user specifies a new security rule for the selected traffic management service class.

2. The method of claim 1 wherein presenting a GUI through which a user specifies a new security rule comprises:
    presenting a screen for determining a match of source and destination IP addresses with a specified source IP address and/or a specified destination IP address;
    presenting a selection screen for specifying an action to be taken upon determination of a match of the source and destination IP addresses of a packet with the specified source IP address and/or the specified destination IP address, wherein the action is selected from one of "drop","reject" and "accept".

3. A method for defining a policy including a set of rules for a packet forwarding device which integrates security and traffic management, the method implemented on a computer system, comprising:
    presenting a graphical user interface (GUI) through which a user can specify and/or modify a policy for the device;
    presenting a network map screen from which the user can add a new security rule or a new traffic management rule to the policy;
    bringing up a security settings screen that allows the user to enter various pieces of information to enable a new security rule to be defined,
wherein the information comprises attributes of IP address matching parameters, operation parameters, and service parameters;
    presenting a screen for specifying "Source IP address" and/or "Destination IP address" attributes;
    presenting a selection screen for specifying an action to be taken on a packet upon determination of a match of said packet's source IP address and/or destination IP address with the specified Source IP address attributes and/or the specified Destination IP address attributes wherein the action is selected from one of "drop","reject", and "accept"; and
    presenting a class selection screen on which the user can also select a traffic management class to which a security rule is to be linked comprising a drop down menu of the existing traffic management classes and a new traffic management class settings screen that allows the user to enter various pieces of information to customize a traffic management rule, wherein the information comprises a total amount of bandwidth that is guaranteed to this class of data flows, whether rate shaping applies to this class of data flows, burst bandwidth, priority, and type of service.

* * * * *